United States Patent
Zhang et al.

(10) Patent No.: US 10,652,565 B1
(45) Date of Patent: May 12, 2020

(54) IMAGE COMPRESSION AND DECOMPRESSION USING EMBEDDINGS

(71) Applicant: Amazon Technologies, inc., Seattle, WA (US)

(72) Inventors: Jia Bi Zhang, Seattle, WA (US); Andrea Olgiati, Gilroy, WA (US); Meng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 15/782,725

(22) Filed: Oct. 12, 2017

(51) Int. Cl.
*H04N 19/463* (2014.01)
*G06K 9/62* (2006.01)
*G06T 9/00* (2006.01)
*G06N 20/00* (2019.01)

(52) U.S. Cl.
CPC ......... *H04N 19/463* (2014.11); *G06K 9/6232* (2013.01); *G06N 20/00* (2019.01); *G06T 9/002* (2013.01)

(58) Field of Classification Search
None
See application file for complete search history.

(56) References Cited

U.S. PATENT DOCUMENTS

| | | | | |
|---|---|---|---|---|
| 5,134,396 A | * | 7/1992 | Sirat | G06K 9/6247 341/51 |
| 5,872,864 A | * | 2/1999 | Imade | G06K 9/00456 382/156 |
| 2016/0292589 A1 | * | 10/2016 | Taylor, Jr. | G06F 16/1744 |

OTHER PUBLICATIONS

Ledig ("Photo-Realistic Single Image Super-Resolution Using a Generative Adversarial Network", Cornell University, received Sep. 2016 (Year: 2016).*
Galteri, Deep Generative Adversarial Compression Artifact Removal, ICCV Apr. 2017 (Year: 2017).*

* cited by examiner

*Primary Examiner* — Mark Roz
(74) *Attorney, Agent, or Firm* — Lowenstein Sandler LLP (57) ABSTRACT

A processing device receives a representation of an image, wherein the image has a first size and the representation has a second size that is smaller than the first size, the representation having been generated from the image by a first portion of a first trained machine learning model. The processing device processes the representation of the image using a second portion of the trained machine learning model to generate a reconstruction of the image and then outputs the reconstruction of the image.

19 Claims, 8 Drawing Sheets

IMAGE COMPRESSION AND DECOMPRESSION USING EMBEDDINGS

BACKGROUND

Conventional image compression techniques such as Joint Photographic Experts Group (JPEG) use a lossy compression for digital images. Such image compression techniques convert an image from a spatial two-dimensional domain into a frequency domain (frequency-based distribution) based on discrete cosine transforms to achieve compression. Higher frequency components are discarded to reduce a file size of a compressed image. The compressed image is then later decompressed by converting the image back into the spatial two-dimensional domain. Such compression and decompression may cause pixilation in the resulting decompressed image. For conventional image compression techniques, the same functions are used for compression and decompression, regardless of the type of image being compressed. The same level of compression is achieved for each portion of patch of the image.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

The present disclosure relates to image compression and decompression using embeddings from a trained machine learning model. A machine learning model such as an artificial neural network may be trained to generate a feature vector (also referred to as an embedding) from an image and to then recreate the image from the feature vector. A middle layer of the machine learning model may be a bottleneck layer or dimensionality reduction layer that generates the feature vector. The feature vector is a much smaller representation of the image in terms of dimensionality and number of bits used to represent the image. Unlike a standard compression technique such as JPEG, the feature vector may include adaptive bitrate compression. Additionally, standard compression techniques such as JPEG have fixed basis functions that are known a priori. In contrast, the machine learning model described in embodiments herein has a learned basis function, which may be different for different areas of an image, and which is learned during a training period for a machine learning model. Once the machine learning model is trained, the machine learning model is divided into two separate parts (also referred to as components or portions). A first portion of the trained machine learning model is trained to generate an embedding (feature vector) from an input image. A second portion of the trained machine learning model is trained to reconstruct an image from an embedding generated by the first portion of the machine learning model.

The separated portions of the trained machine learning model may be installed on different computing devices, which may be separated by a network. An image may be converted into an embedding by the first portion of the trained machine learning model, transmitted over the network, and then processed by the second portion of the trained machine learning model to reproduce the image. The machine learning model may be trained to compress and decompress particular types of images, and may identify regions of an image of a particular class that are more important and regions that are less important. Fewer features and/or a lower number of dimensions may be used to represent those areas that are of lesser importance, while a greater number of features and/or number of dimensions may be used to represent those areas of the image that are of greater importance. Therefore, adaptive bitrate compression may be achieved to represent important areas of images with lesser compression and to represent less important areas of the images with greater compression. Such adaptive bitrate compression enables a high level of compression without sacrificing image quality regarding important features in the images, such as faces, eyes, and so on.

In one embodiment, a first computing device receives an image having a first size. The first computing device processes the image using a first portion of a trained machine learning model to generate a representation of the image, the representation having a second size that is smaller than the first size (e.g., in terms of file size, dimensionality and/or number of bits). In one embodiment, the first computing device sends the representation of the image to a second computing device comprising a second portion of the trained machine learning model. Alternatively, or additionally, the first computing device may store the representation of the image. The second computing device processes the representation using the second portion of the trained machine learning model to generate a reconstructed image. Alternatively, this may be performed on the first computing device (e.g., if the representation was stored on the first computing device). In one embodiment, the second computing device processes the reconstructed image using a generative adversarial network (GAN) to generate an improved version of the reconstructed image, which may have greater clarity than the reconstructed image.

Figure 1A:
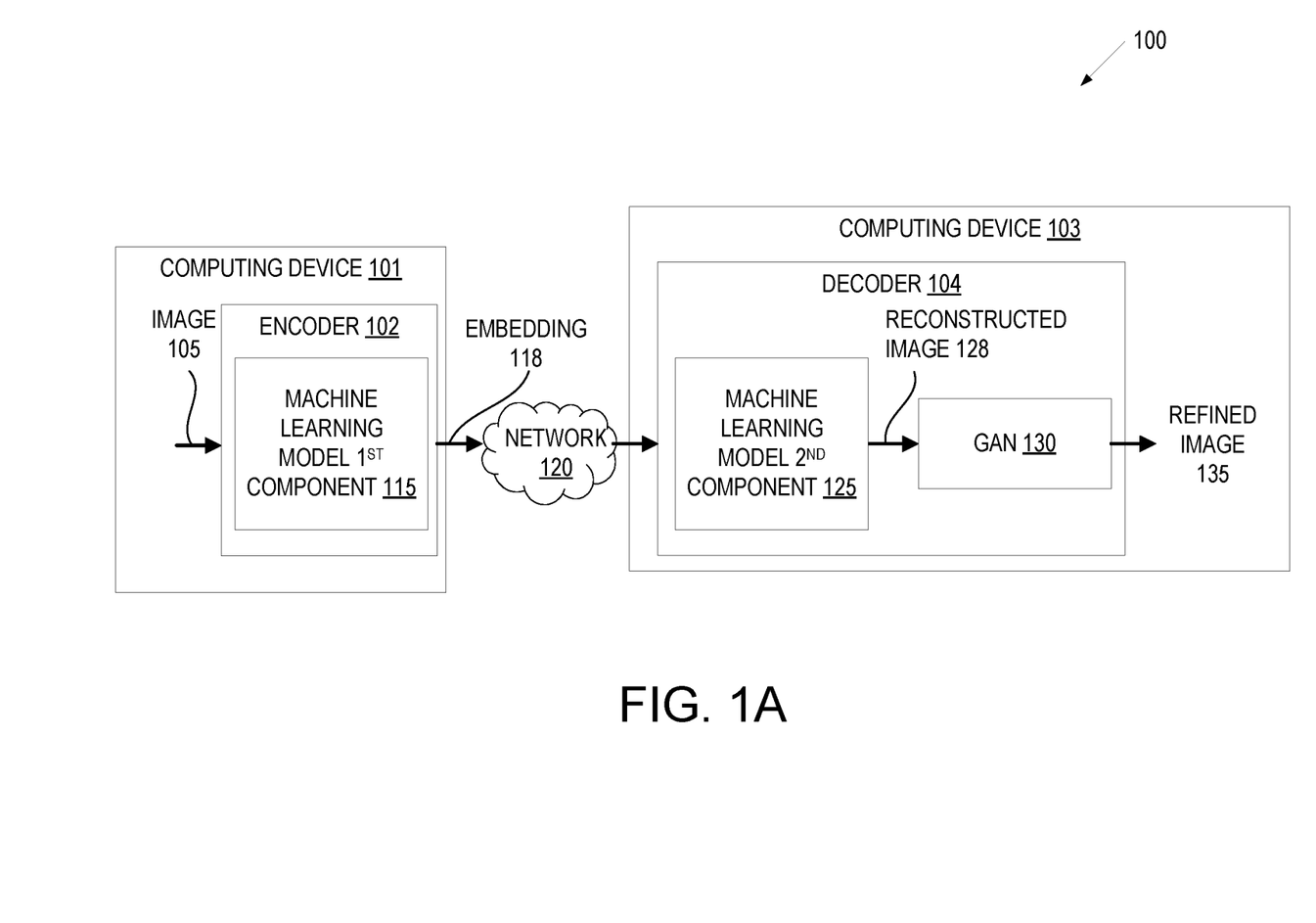
FIG. 1A illustrates a system architecture for compressing and decompressing images, according to one embodiment of the present disclosure.

Referring now to the figures, FIG. 1A illustrates a system architecture of a system 100 for compressing and decompressing images, according to one embodiment of the present disclosure. The system 100 includes a first computing device 101 that includes an encoder 102 and a second computing device 103 that includes a decoder 104. The first computing device 101 and second computing device 103 are separated by a network 120. Alternatively, or additionally, the encoder 102 and decoder 104 may be collocated on a single computing device (e.g., both computing device 101 and computing device 103 may include copies of the encoder 102 and decoder 104).

In one embodiment, the computing devices 101, 103 may each be one of a mobile phone, a smart phone, a laptop computer, a tablet computer, a netbook, a notebook, a desktop computer, a gaming console, a server computer (e.g., a rackmount server), or other type of computing device. In one embodiment, one or more of the computing devices 101, 103 is a server computing device such as a rackmount server. The server computing devices may include physical machines and/or virtual machines hosted by physical machines. The physical machines may be rackmount servers, desktop computers, or other computing devices. In one embodiment, the server computing devices include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer.

Network 120 may be a local area network (LAN), wide area network (WAN), wireless network, intranet, the Internet, or a combination thereof. Network 120 may additionally or alternatively include a direct wired connection (e.g., via an Ethernet connection, a universal serial bus (USB) connection, a Firewire connection, a Lightning connector, a peripheral component interconnect express (PCIe) connection, a serial connection, a small computer system interface (SCSI) connection, etc.), or a wireless connection (e.g., a Bluetooth® connection, a ZigBee® connection, etc.). Network 120 may additionally or alternatively include a wireless network provided by a wireless carrier, such as wireless networks that operate using second generation (2G) wireless communication standards (e.g., Global System for Mobile Communications (GSM)), third generation (3G) wireless communication standards (e.g., Universal Mobile Telecommunications Service (UMTS), Code Division Multiple Access 2000 (CDMA2000), Enhanced Data Rates for GSM Evolution (EDGE), etc.), and/or fourth generation (4G) wireless communication standards (e.g., Long Term Evolution (LTE) and Worldwide Interoperability for Microwave Access (WiMAX)) standards.

The encoder 102 is configured to compress images using a first component of a trained machine learning model 115. The encoder 102 receives an image 105 and processes the image using the first component of the trained machine learning model 115 to produce an embedding 118. In one embodiment, the image 105 is a two-dimensional (2D) image, which may be a standalone image or may be a frame of a video. In one embodiment, a video is input into encoder 102 rather than an image. In one embodiment, the image 105 is a three-dimensional (3D) image. The embedding is a representation (e.g., a feature vector) generated from the image that has a much smaller dimensionality than the image 105.

The computing device 101 sends the embedding 118 over network 120 to computing device 103. Computing device 103 inputs the embedding 118 into decoder 104. The embedding 118 is input into the second component of the machine learning model 125, which processes the embedding 118 to generate a reconstructed image 128. The reconstructed image 128 may lack some of the image information from the original image 105. In one embodiment, the image quality of the reconstructed image 128 (e.g., amount of pixilation, amount of blurriness, amount of artifacts, degree of similarity to image 105, etc.) may be variable within reconstructed image 128. For example, in a picture of a face, there may be lower blurriness around the eyes and mouth of the face and a greater blurriness around the hair and background of the image.

The first component of the trained machine learning model 115 and the second component of the trained machine learning model 125 may be two parts of a single trained machine learning model. For example, the trained machine learning model may be an artificial neural network or a pair of artificial neural networks arranged in series. In one embodiment, the trained machine learning model is an autoencoder. In one embodiment, the trained machine learning model is a convolutional autoencoder. The convolution operator allows filtering an input signal in order to extract some part of its content. Autoencoders traditionally do not take into account the fact that an input can be seen as a sum of other inputs (e.g., portions of the input). Convolutional autoencoders, instead, use the convolution operator to exploit this observation. They learn to encode the input in a set of simple signals and then try to reconstruct the input from them. In one embodiment, the trained machine learning model is a model that performs principal component analysis (PCA). The machine learning model may have been trained while these two components were still combined. However, after training the trained machine learning model may have been separated and the disparate parts may have been added to an encoder 102 and decoder 104, respectively. The first machine learning model component 115 may be a first neural network and the second component of the machine learning model 125 may be a second neural network. As shown, the encoder 102 and decoder 104 may then be installed on computing device 101 and computing device 103.

In one embodiment, decoder 104 includes a generative adversarial network (GAN) 130 that has been trained to improve the image quality of reconstructed images (e.g., such as reconstructed image 128). In one embodiment, the GAN 130 is a separate component that is not a part of decoder 104. In one embodiment, no GAN is used. The GAN 130 may process the reconstructed image 128 to generate a refined image 135 (also referred to as an improved image). The reconstructed image 128 may include various levels of blurriness at different regions of the reconstructed image. The GAN 130 may have been trained to remove the blurriness from the reconstructed image 128 and produce the refined image 135, which may be indistinguishable from a photograph to a human eye. The GAN 130 may additionally or alternatively perform super-resolution to transform the reconstructed image 128 into a higher resolution image.

A GAN 130 is a class of artificial intelligence system that uses two artificial neural networks contesting with each other in a zero-sum game framework. The GAN 130 includes a first artificial neural network that generates candidates and a second artificial neural network that evaluates the generated candidates. The GAN learns to map from a latent space to a particular data distribution of interest (a data distribution of changes to input images that are indistinguishable from photographs to the human eye), while the discriminative network discriminates between instances from a training dataset and candidates produced by the generator. The generative network's training objective is to increase the error rate of the discriminative network (e.g., to fool the discriminator network by producing novel synthesized instances that appear to have come from the training dataset). The generative network and the discriminator network are co-trained, and the generative network learns to generate images that are increasingly more difficult for the discriminative network to distinguish from real images (from the training dataset) while the discriminative network at the same time learns to be better able to distinguish between synthesized images and images from the training dataset. The two networks of the GAN 130 are trained once they reach equilibrium.

The first component of the machine learning model 115 and/or the second component of the machine learning model may include a hyperparameter that controls the level of compression. More specifically, the hyperparameter may control the dimensionality permitted for the embedding 118 and/or a permitted file size for the embedding 118. A hyperparameter of a machine learning model is a parameter whose value is set prior to commencement of the training process. Once the machine learning model is trained, the hyperparameter that controls the level of compression may be adjusted to increase or decrease the level of compression.

In one embodiment, the machine learning model is trained separately for each setting of the compression hyperparameter. Different machine learning models may then be generated for each setting of the compression hyperparameter. In such an embodiment, the first machine learning component 115 is one of multiple different machine learning model components in encoder 102, where each component is associated with a different setting for the compression hyperparameter. Similarly, second machine learning component 125 may be one of multiple different machine learning model components in decoder 104. Alternatively, a single trained machine learning model may be used, and the compression hyperparameter may be adjusted after training for that machine learning model.

In one embodiment, embedding 118 includes metadata that indicates a setting for the compression hyperparameter that was used to generate the embedding 118. This may enable decoder 104 to set a corresponding compression hyperparameter of the second machine learning model component 125 or to select an appropriate machine learning model component that was trained using the identified compression hyperparameter setting. In one embodiment, the trained machine learning model having first component 115 and second component 125 is over constrained during training such that the embedding 118 has a minimal amount of information. The compression hyperparameter may then be adjusted after training to permit the embedding to have a greater amount of information. This may permit a single machine learning model to work for multiple different compression hyperparameter settings.

In a traditional compression technique such as JPEG, increasing the compression causes increased levels of pixilation and lower quality images. In contrast, in one embodiment increasing the compression hyperparameter of the trained machine learning model causes a difference (e.g., a delta) between the image 105 and the reconstructed image 128 and/or refined image 135 to increase. In an example, increasing the compression hyperparameter may cause hair and/or a background in an image of a face to be increasingly dissimilar to the hair and/or background in image 105. However, the image 105 and refined image 135 may each appear to be original high quality images. Accordingly, after reconstructions (and possibly refinement by GAN 130) one or more pixel values of the reconstructed image 128 and/or refined image 135 may be completely different from the pixel values of image 105. However, the concept represented in the image 105 and the reconstructed image 128 and/or refined image 135 will be the same, and the image quality may be the same. A person looking at the image 105 and reconstructed image 128 and/or refined image 135 side by side might recognize the images as being different images, but would see that the two pictures contain very similar content. In one embodiment, the encoder 102 may be viewed as compressing the information of the image 105 as opposed to the actual pixel values of the image 105.

Figure 1B:
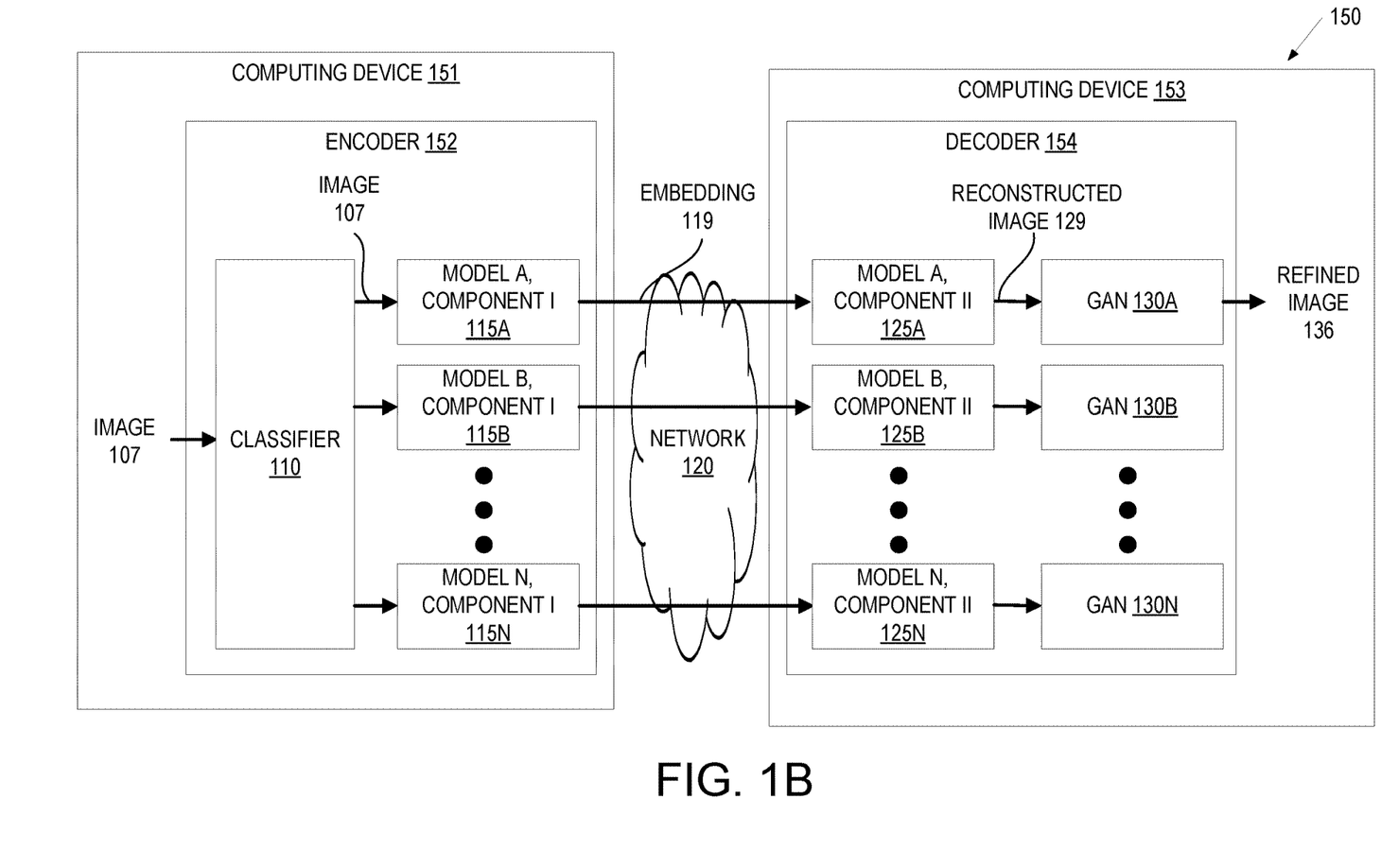
FIG. 1B illustrates an additional system architecture for compressing and decompressing images, according to one embodiment of the present disclosure.

FIG. 1B illustrates an additional system architecture of a system 150 for compressing and decompressing images, according to one embodiment of the present disclosure. Similar to system 100, system 150 includes a computing device 151 with an encoder 152 installed thereon and a computing device 153 with a decoder 154 installed thereon. The first computing device 151 and the second computing device 153 are separated by network 120.

In one embodiment, encoder 152 includes first components (e.g., encoder components) of multiple different machine learning models 115A, 115B, through 115N. Similarly, decoder 154 includes second components (e.g., decoder components) of multiple different machine learning models 125A, 125B, through 125N. Each of the first components 115A-N form a trained machine learning model in combination with one of the corresponding second components 125A-N. Each of the trained machine learning models is trained to compress and decompress a different class or category of image. For example, model A, component I 115A may be trained to compress images of faces by generating embeddings of images of faces and model A, component II 125A may be trained to decompress images of faces by reconstructing images of faces from received embeddings output by model A, component I 115A. In other examples, model B, component I 115B may be trained to compress images of cars and model B, component II 125B may be trained to decompress images of cars. Each of the trained machine learning models (including a corresponding first component 115A-N and second component 125A-N) may be trained to operate on a different class of images, such as faces, cars, houses, logos, animals, landscapes, and so on. Each model may generate unique embeddings appropriate to that model, where the unique embeddings discard more information around image patches or regions that are less important to an image of a particular image class and discard less information around image patches or regions that are more important to the particular image class.

In one embodiment, encoder 152 includes a classifier 110. Classifier 110 is an additional machine learning model that has been trained to classify images into the various image classes associated with each of the machine learning models A, B, through N (e.g., that include first components 115A-N and second components 125A-N). In one embodiment, classifier 110 is an artificial neural network. Classifier 110 may have been trained using a training dataset that includes labeled images of each of the image classes. Each of the machine learning models A-N may have been trained using a separate training dataset including images of a particular image class. In one embodiment, classifier 110 is not part of encoder 152, and is instead a separate component distinct from encoder 152.

During operation, encoder 152 receives an image 107 and inputs the image 107 into classifier 110. Classifier 110 outputs an image classification for the image 107. Encoder 152 then selects a first component of an appropriate trained machine learning model 115A-N that is associated with the determined image classification and inputs the image 107 into the selected first component 115A-N. The selected first component (e.g., first component 115A) then processes the image 107 to generate an embedding 119 of the image 107. In one embodiment, the embedding 119 includes metadata that identifies the specific first component 115A-N that generated the embedding and/or that identifies the image classification of the image. In one embodiment, the embedding 119 further includes metadata that identifies a compression hyperparameter used to generate the embedding 119. In one embodiment, computing device 151 sends the embedding 119 over network 120 to computing device 153.

Decoder 154 selects an appropriate second component of a trained machine learning model 125A-N based on the metadata included in the embedding 119 (e.g., based on the metadata identifying the image classification and/or based on the metadata identifying the first component 115A-N that generated the embedding). In one embodiment, decoder 154 additionally determines a compression hyperparameter setting to use for the selected second component 125A-N based on the metadata.

The selected second component 125A-N processes the embedding 119 to generate a reconstructed image 129. In one embodiment, decoder 154 further includes a plurality of GANs 130A, 130B, through 130N, where each GAN 130A-N is associated with a different image classification. In one embodiment, decoder 154 selects an appropriate GAN 130A-N to process the reconstructed image 129 based on the second component 125A-N that was used to generate the reconstructed image 129 and/or based on the metadata that was included in the embedding 119. Each GAN 130A-N may be trained to improve the image quality of a particular class of images. The selected GAN (e.g., GAN 130A) may then process the reconstructed image 129 to generate a refined image 136. In one embodiment, a single GAN is used for all image classes rather than separate GANs for each image class. In one embodiment, no GAN is used. In one embodiment, the GANs 130A-N are not part of decoder 154, and are instead separate components distinct from decoder 154.

Figure 2A:
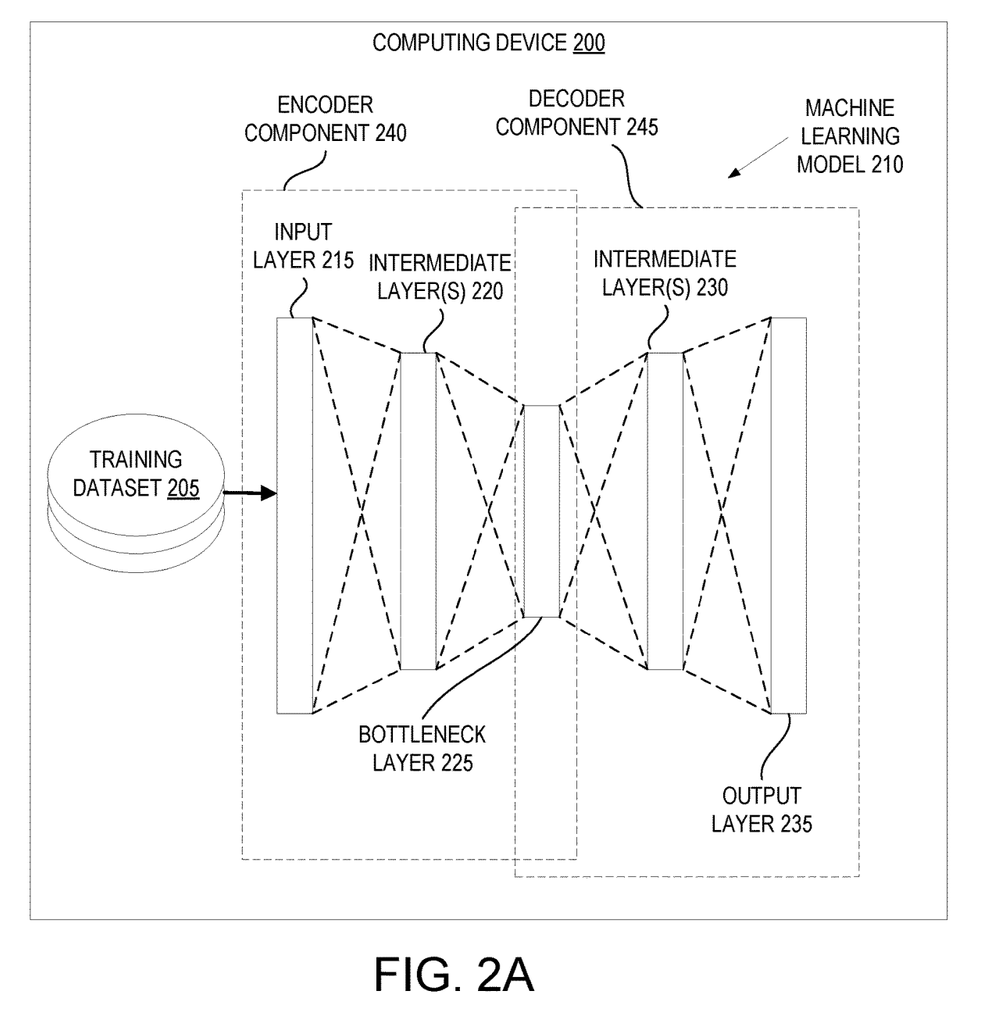
FIG. 2A illustrates training of a machine learning model for compressing and decompressing images, according to one embodiment of the present disclosure.

FIG. 2A illustrates training of a machine learning model 210 for compressing and decompressing images, according to one embodiment of the present disclosure. In one embodiment, machine learning model 210 is an autoencoder (e.g., a convolutional autoencoder) that includes an encoder component 240 and a decoder component 245. The encoder component 240 includes an input layer 215, one or more intermediate layers 220 and a bottleneck layer 225. The decoder component 245 includes the bottleneck layer 225, one or more additional intermediate layers 230 and an output layer 235.

The machine learning model 210 is initialized with initialization parameters. During training, images from a training dataset 205 are then input into the machine learning model 210 in series. The various layers 215-235 process the image, with the input layer 215, each of the intermediate layers 220 and the bottleneck layer 225 generating representations of the image, wherein the representation generated by bottleneck layer 225 is an embedding of the image, and with intermediate layers 230 each performing an approximately inverse process to a corresponding intermediate layer 220 and/or to the bottleneck layer 225. The bottleneck layer 225 performs dimensionality reduction to generate the embedding. For example, the bottleneck layer 225 may decompose a 28×28 pixel image into 30 folding point numbers. The intermediate layers 220 generate representations that are usable by the bottleneck layer to perform the dimensionality reduction. The output layer 235 then generates a reconstructed image, which is compared to the input image from the training dataset 205. An error is calculated based on a difference between the input image and the reconstructed image, and parameters of nodes in each of the layers 215, 220, 225, 230, 235 are then updated based on the error (e.g., using deep stochastic gradient descent). After all of the images in the training dataset 205 are processed by the machine learning model 210 one or more times, the machine learning model is trained.

Figure 2B:
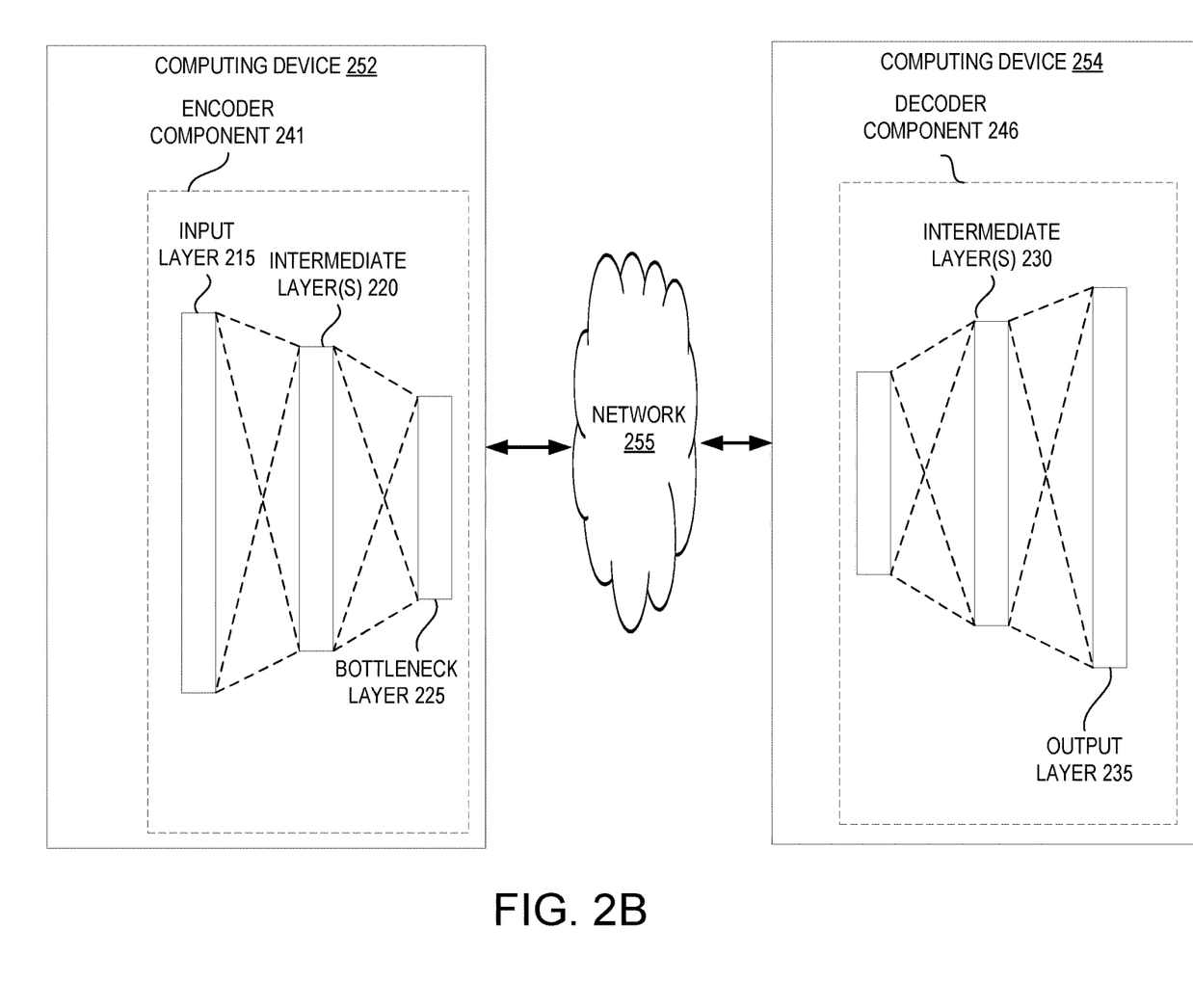
FIG. 2B illustrates the trained machine learning model of FIG. 2A after the machine learning model has been divided into an encoder component and a decoder component that are installed on separate computing devices, according to one embodiment of the present disclosure.

FIG. 2B illustrates the trained machine learning model of FIG. 2A after the machine learning model has been divided into an encoder component 241 and a decoder component 246 that are installed on separate computing devices 252, 254 separated by a network 255, according to one embodiment of the present disclosure. The encoder component 241 may match encoder component 240 and the decoder component 246 may match decoder component 240. In one embodiment, the encoder component 241 is included in an encoder (e.g., encoder 102 or 152) that may include other components and decoder component 254 is included in a decoder (e.g., decoder 104 or 154) that may include other components. Once trained and separated, the encoder component 241 and decoder component 246 of the trained machine learning model may be used to compress and decompress images that are transmitted over a network. Such compression may achieve smaller compressed image files (embeddings) than traditional compression techniques (e.g., JPEG) while resulting in higher quality images after decompression.

FIGS. 2A-2B are described with relation to a machine learning model 210 that is an autoencoder (e.g., a convolutional autoencoder). However, in an alternative embodiment the machine learning model 210 may be a PCA model. In such an embodiment, the encoder component 240, 241 may be a forward projection matrix and the decoder component 245, 246 may be an inverse projection matrix. In one embodiment, the encoder component 240, 241 and the decoder component 245, 246 do not include any intermediate layers.

Embodiments are described herein above and below with reference to compression of images one a first computing device, transmission of the compressed images over a network, and decompression of the images on a second computing device. It should be understood, however, that the same compression and decompression techniques may also be used to compress images for storage. In one embodiment, a computing device includes both an encoder and a decoder as described herein. In one embodiment, the encoder generates an embedding from the image, and the image is then stored. The embedding is later retrieved, and the embedding is processed using an appropriate decoder to reconstruct the image from the embedding. Accordingly, embodiments may apply to image compression to reduce storage utilization on a storage device as well as to reduce bandwidth utilization over a network.

Figure 3:
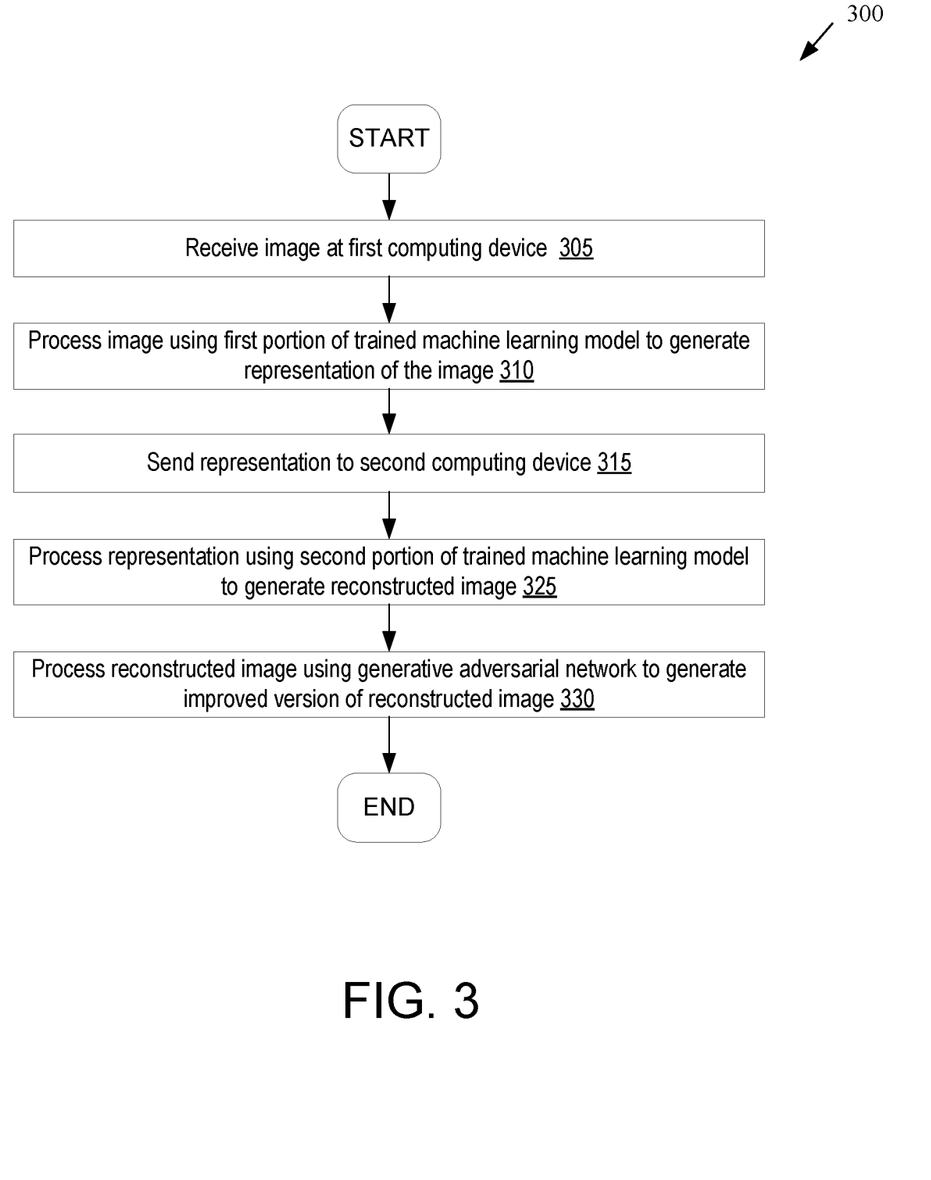
FIG. 3 depicts a flowchart illustrating one embodiment for a method of compressing and decompressing images using separated portions of a trained machine learning model.
Figure 4:
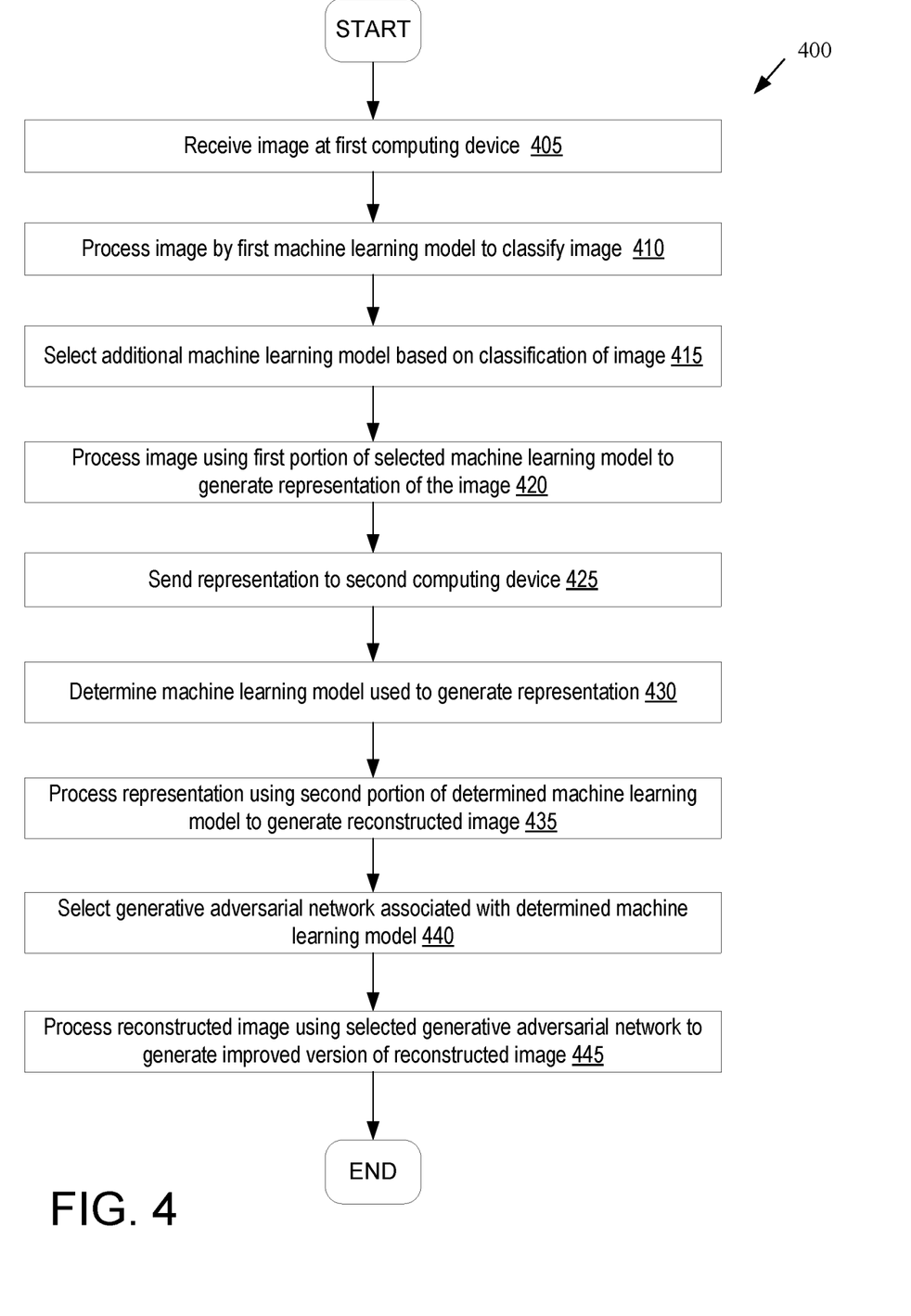
FIG. 4 depicts a flowchart illustrating one embodiment for a method of compressing and decompressing images using separated portions of a trained machine learning model.
Figure 5:
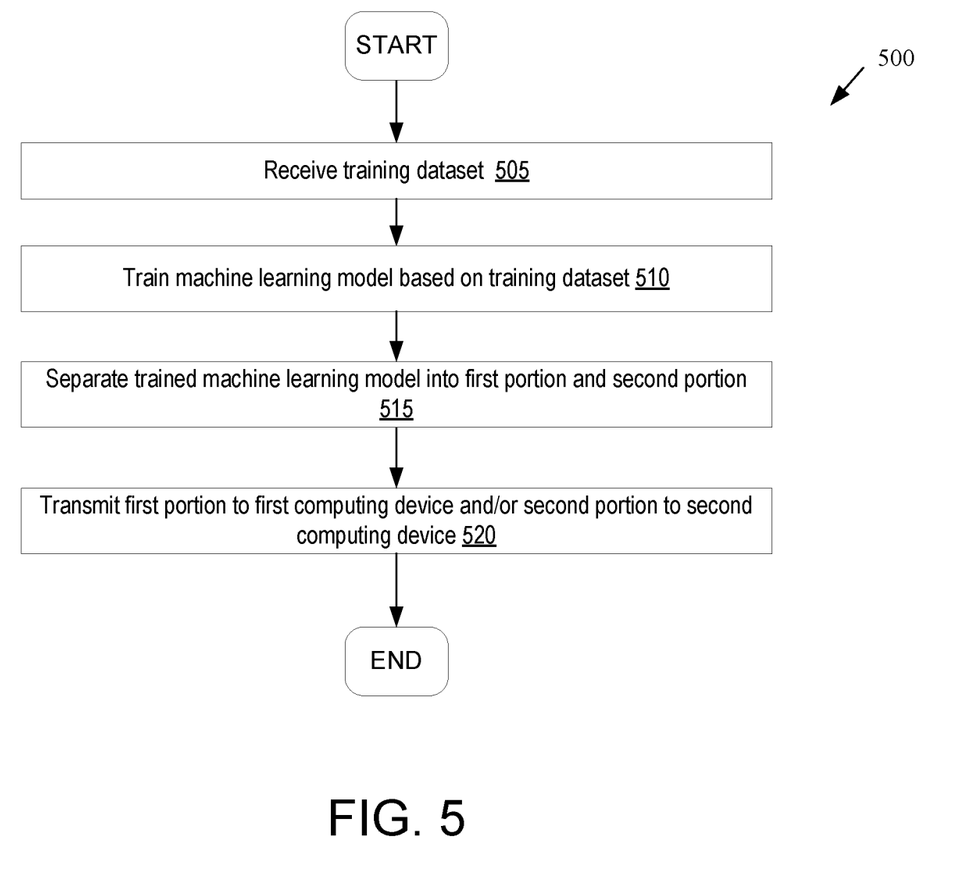
FIG. 5 depicts a flowchart illustrating one embodiment for a method of training a machine learning model to compress and decompress images and separating the machine learning model into an encoder and a decoder.

FIGS. 3-5 are flow diagrams showing various methods for using a divided trained machine learning model to compress and decompress images, in accordance with embodiments of the disclosure. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing an encoder and/or a decoder, such as encoders 102, 152 and decoders 104, 154 of FIGS. 1A-B.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 3 depicts a flowchart illustrating one embodiment for a method 300 of compressing and decompressing an image using two parts of a trained machine learning model that are separated by a network. At block 305, a first computing device receives an image. At block 310, the first computing device processes the image using a first portion of a trained machine learning model to generate a representation of the image. At block 315, the first computing device sends the representation (e.g., an embedding or feature vector) to a second computing device.

At block 325, the second computing device processes the representation using a second portion of the trained machine learning model to generate a reconstructed image. In one embodiment, at block 330 the second computing device processes the reconstructed image using a GAN to generate an improved or refined version of the reconstructed image. The first component of the trained machine learning model and the second component of the trained machine learning model may have been trained as set forth herein above. Additionally, the GAN may have been trained as set forth herein above.

FIG. 4. depicts a flowchart illustrating one embodiment for a method 400 of compressing and decompressing images using separated portions of a trained machine learning model. At block 405, a first computing device receives an image. At block 410, the first computing device processes the image using a first machine learning model to classify the image. The first machine learning model may be, for example, an artificial neural network trained to distinguish between a fixed number of different image classes. At block 415, the first computing device selects an additional machine learning model based on the classification of the image. The selected machine learning model is a machine learning model that has been trained to compress and decompress images of the identified image classification.

At block 420, the first computing device processes the image using a first portion of the selected additional machine learning model to generate a representation of the image. At block 425, the first computing device sends the representation (e.g., an embedding or feature vector) to a second computing device.

At block 430, processing logic determines the machine learning model that was used to generate the representation. In one embodiment, metadata is added to the embedding by the first portion of the selected machine learning model (or by a subsequent component of an encoder that includes the selected machine learning model). The metadata may be used to determine the machine learning model that generated the representation of the image.

At block 435, the second computing device processes the representation using a second portion of the selected additional machine learning model to generate a reconstructed image. In one embodiment, at block 440 the second computing device selects a GAN associated with the selected additional machine learning model. The GAN may be a GAN trained to improve images having the determined image classification. At block 445, the second computing device processes the reconstructed image using the selected GAN to generate an improved or refined version of the reconstructed image.

Methods 300 and 400 have been described with reference to two computing devices that are separated by a network, where one computing device performs operations associated with compression of an image and the other computing device performs operations associated with decompression of the image. However, in alternative embodiments compression and decompression may be performed on the same computing device. In such embodiments, rather than sending or transmitting the representation, a computing device may store the representation in a storage device, which may be, for example, a local storage device or a network storage device (e.g., a network attached storage (NAS), storage area network (SAN), cloud storage, and so forth). The first computing device may then later retrieve the representation, and decompress the representation using the techniques described herein. Alternatively, a first computing device may generate the representation and store the representation in a network storage. A second computing device may then retrieve the representation from the network storage and then decompress the image from the representation using the techniques described herein.

FIG. 5. depicts a flowchart illustrating one embodiment for a method 500 of training a machine learning model to compress and decompress images and separating the machine learning model into an encoder and a decoder. At block 505 of method 500, processing logic receives a training dataset. At block 510, processing logic initializes a machine learning model (e.g., an autoencoder, convolutional autoencoder or model that applies PCA), and then trains the machine learning model using the training dataset. The machine learning model is trained to reduce an input image into an embedding having a reduced dimensionality and to then reconstruct the image from the embedding.

At block 515, processing logic separates the trained machine learning model into a first portion and a second portion. In one embodiment, the first portion includes an input layer, one or more intermediate layers, and a bottleneck layer or other dimensionality reduction layer. In one embodiment, the second portion includes an input layer (which corresponds to the bottleneck layer or dimensionality reduction layer of the first portion), one or more intermediate layers, and an output layer. In one embodiment, the second portion includes one or more intermediate layers and the output layer, but lacks the bottleneck layer.

At block 520, the first portion is transmitted to a first computing device and the second portion is transmitted to a second computing device. In one embodiment, an encoder is generated that includes the first portion and one or more additional components, such as a classifier, one or more first portions of other machine learning models, a component to select a first portion of a machine learning model, a component to add metadata to generated embeddings, and so on. In one embodiment, a decoder is generated that includes the second portion and one or more GANs, one or more additional second portions of other machine learning models, a component to select a second portion of an appropriate machine learning model, a component to select an appropriate GAN, and so on. The encoder may be sent to the first computing device and the decoder may be sent to the second computing device.

Figure 6:
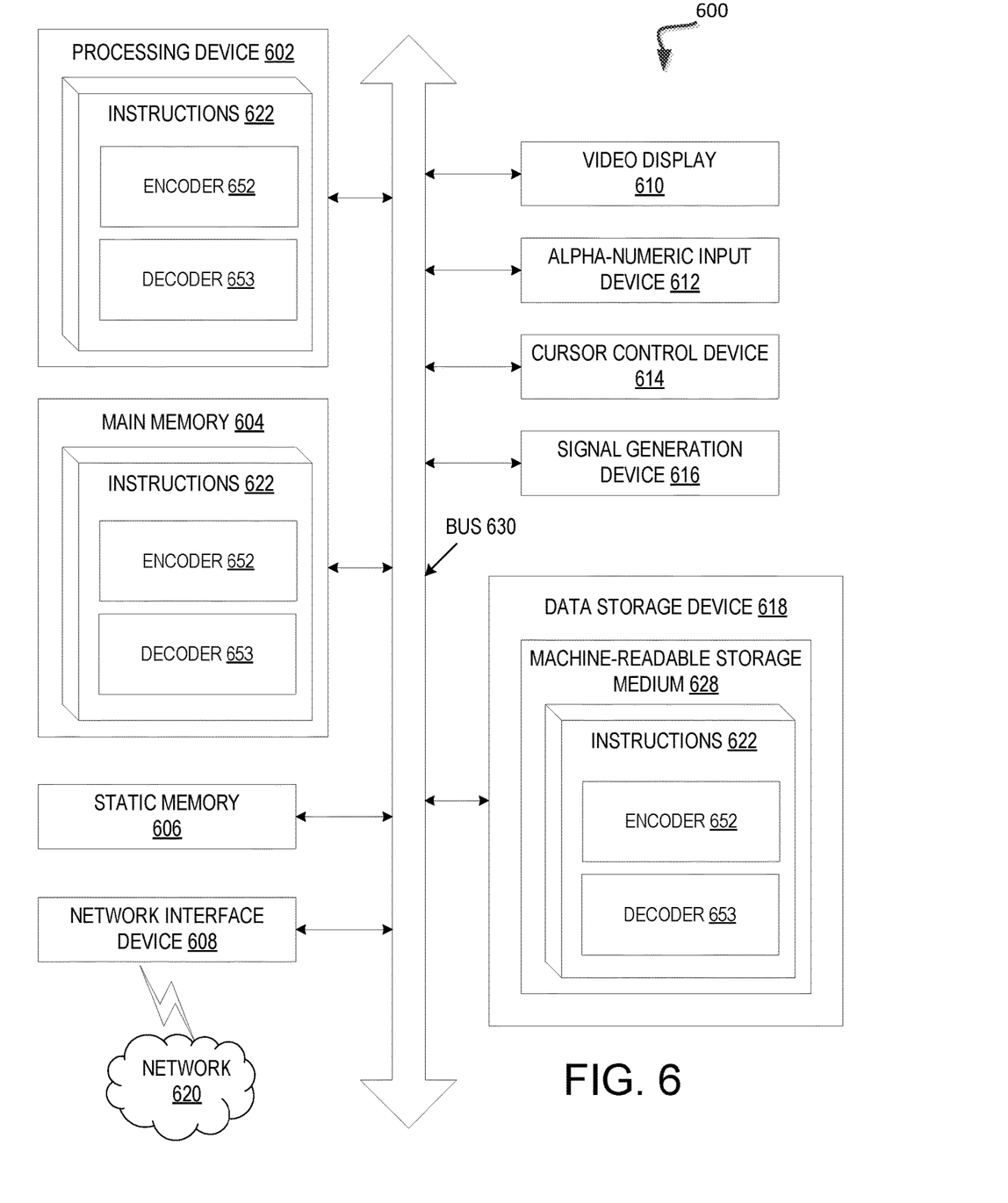
FIG. 6 is a schematic block diagram that provides one example illustration of a computing device executing a dataset suitability tester, according to one embodiment of the present disclosure.

FIG. 6 illustrates a diagrammatic representation of a machine in the exemplary form of a computer system (computing device) 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for an encoder 652 and/or a decoder 653 for performing the operations discussed herein. In one embodiment, encoder 652 corresponds to encoder 102 of FIG. 1A or encoder 152 of FIG. 1B. In one embodiment, decoder 653 corresponds to decoder 104 of FIG. 1A or decoder 154 of FIG. 1B.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions of the encoder 652 and/or decoder 653 embodying any one or more of the methodologies or functions described herein. The instructions may also reside, completely or at least partially, within the main memory 604 and/or within processing logic of the processing device 602 during execution thereof by the computer system 600, the main memory 604 and the processing device 602 also constituting computer-readable media.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "processing", "sending", "selecting", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving an image at a first computing device, the image having a first size;
processing, by the first computing device, the image using a first portion of a first trained machine learning model to generate a representation of the image, the representation having a second size that is smaller than the first size;
sending the representation of the image to a second computing device comprising a second portion of the first trained machine learning model, wherein the first trained machine learning model was separated into the first portion and the second portion after training of the first trained machine learning model was performed;
processing, by the second computing device, the representation using the second portion of the first trained machine learning model to generate a reconstructed image; and
processing the reconstructed image using a generative adversarial network (GAN) to generate an improved version of the reconstructed image;
wherein a middle layer of the first trained machine learning model is a dimensionality reduction layer that generates the representation of the image, wherein the first trained machine learning model was trained while the first portion and the second portion were combined, and wherein the first trained machine learning model was separated at the dimensionality reduction layer into the first portion and the second portion after the training of the first trained machine learning model was performed.

2. The method of claim 1, further comprising performing the following prior to processing the image using the first portion of the first trained machine learning model:
processing the image using a second trained machine learning model that is trained to classify images;
determining that the image has a first image classification; and
selecting the first trained machine learning model from a plurality of trained machine learning models, wherein each of the plurality of trained machine learning models is associated with a different image classification and wherein the first trained machine learning model is associated with the first image classification.

3. The method of claim 2, wherein the image has a first image quality, wherein the reconstructed image comprises a second image quality that is lower than the first image quality, and wherein the improved version of the reconstructed image approximately has the first image quality, the method further comprising:
selecting the GAN from a plurality of GANs, wherein each GAN of the plurality of GANs is associated with a different image classification and wherein the GAN is associated with the first image classification.

4. A system comprising:
a first computing device comprising:
a processing device; and
a memory to store computer executable instructions that, if executed, cause the processing device to:
receive an image, the image having a first size;
process the image using a first portion of a first trained machine learning model to generate a representation of the image, the representation having a second size that is smaller than the first size; and
send the representation of the image to a second computing device comprising a second portion of the first trained machine learning model, wherein the first trained machine learning model was separated into the first portion and the second portion after training of the first trained machine learning model was performed, wherein the second portion of the first trained machine learning model is to generate a reconstruction of the image from the representation;
wherein a middle layer of the first trained machine learning model is a dimensionality reduction layer that generates the representation of the image, wherein the first trained machine learning model was trained while the first portion and the second portion were combined, and wherein the first trained machine learning model was separated at the dimensionality reduction layer into the first portion and the second portion after the training of the first trained machine learning model was performed.

5. The system of claim 4, wherein the instructions, if executed, further cause the processing device to:
receive a training dataset comprising a first plurality of images having a first image classification;
train a first machine learning model using the training dataset to generate the first trained machine learning model;
separate the first trained machine learning model into the first portion and the second portion after training of the first trained machine learning model is complete; and
transmit the second portion to the second computing device.

6. The system of claim 4, wherein the first trained machine learning model comprises a convolutional autoencoder, wherein the first portion comprises an encoder component of the convolutional autoencoder, and wherein the second portion comprises a decoder component of the convolutional autoencoder.

7. The system of claim 4, wherein the instructions, if executed, further cause the processing device to perform the following prior to processing the image using the first portion of the first trained machine learning model:
 process the image using a second trained machine learning model that is trained to classify images;
 determine that the image has a first image classification; and
 select the first trained machine learning model from a plurality of trained machine learning models, wherein each of the plurality of trained machine learning models is associated with a different image classification and wherein the first trained machine learning model is associated with the first image classification.

8. The system of claim 7, wherein the second computing device is further to:
 select a generative adversarial network (GAN) from a plurality of GANs, wherein each GAN of the plurality of GANs is associated with a different image classification and wherein the GAN is associated with the first image classification; and
 process the reconstruction of the image using the GAN to generate an improved version of the reconstruction.

9. The system of claim 4, further comprising the second computing device, wherein the second computing device is to:
 receive the representation of the image;
 determine that the representation of the image has been generated from the first portion of the first trained machine learning model; and
 process the representation of the image using the second portion of the first trained machine learning model to generate the reconstruction of the image.

10. The system of claim 9, wherein the reconstruction of the image comprises one or more defects, and wherein the second computing device is further to:
 determine that the reconstruction of the image was generated by the second portion of the first trained machine learning model; and
 process the reconstruction using a generative adversarial network (GAN) to generate an improved version of the reconstruction of the image, wherein the improved version of the reconstruction of the image lacks at least one defect of the one or more defects, and wherein the GAN is associated with the first trained machine learning model.

11. The system of claim 4, wherein the instructions, if executed, further cause the processing device to:
 adjust a hyperparameter of the first trained machine learning model, wherein the hyperparameter controls an amount of information included in representations of images generated by the first portion of the first trained machine learning model;
 process the image using the first portion of the first trained machine learning model to generate a new representation of the image, the new representation having a third size that is lower than the second size; and
 send the new representation of the image to the second computing device comprising a second portion of the first trained machine learning model, wherein the second portion of the first trained machine learning model is to generate a new reconstruction of the image from the new representation, and wherein a first delta between the image and the new reconstruction is greater than a second delta between the image and the reconstruction.

12. The system of claim 4, wherein the instructions, if executed, further cause the processing device to:
 store the representation of the image in a data store;
 receive a request for the image from a requestor;
 retrieve the representation of the image from the data store;
 determine that the representation of the image has been generated from the first portion of the first trained machine learning model;
 process the representation of the image using the second portion of the first trained machine learning model to generate the reconstruction of the image; and
 provide the reconstruction of the image to the requestor.

13. A non-transitory computer-readable storage device storing computer-executable instructions that, if executed by a processing device, cause the processing device to:
 receive, by the processing device, a representation of an image, wherein the image has a first size and the representation has a second size that is smaller than the first size, the representation having been generated from the image by a first portion of a first trained machine learning model;
 process, by the processing device, the representation of the image using a second portion of the first trained machine learning model to generate a reconstruction of the image, wherein the first trained machine learning model was separated into the first portion and the second portion after training of the first trained machine learning model was performed; and
 output the reconstruction of the image;
 wherein a middle layer of the first trained machine learning model is a dimensionality reduction layer that generates the representation of the image, wherein the first trained machine learning model was trained while the first portion and the second portion were combined, and wherein the first trained machine learning model was separated at the dimensionality reduction layer into the first portion and the second portion after the training of the first trained machine learning model was performed.

14. The non-transitory computer-readable storage device of claim 13, wherein the instructions, if executed, further cause the processing device to:
 process the reconstruction of the image using a generative adversarial network (GAN) to generate an improved version of the reconstruction.

15. The non-transitory computer-readable storage device of claim 14, wherein the image has a first image quality, wherein the reconstruction of the image comprises a second image quality that is lower than the first image quality, and wherein the improved version of the reconstruction approximately has the first image quality.

16. The non-transitory computer-readable storage device of claim 14, wherein the first trained machine learning model is one of a plurality of trained machine learning models, each of the plurality of trained machine learning models being associated with a different image classification, and wherein the instructions, if executed, further cause the processing device to:
 determine that the image has a first image classification; and select the GAN from a plurality of GANs, wherein each GAN of the plurality of GANs is associated with a different image classification and wherein the GAN is associated with the first image classification.

17. The non-transitory computer-readable storage device of claim 13, wherein the instructions, if executed, further cause the processing device to:
receive the image;
process the image using the first portion of the first trained machine learning model to generate the representation of the image; and
store the representation of the image.

18. The non-transitory computer-readable storage device of claim 13, wherein the representation of the image is received from a remote computing device that comprises the first portion of the first trained machine learning model.

19. The method of claim 1, further comprising:
adjusting, after the first trained machine learning model is trained, a hyperparameter of the first trained machine learning model, wherein the hyperparameter controls an amount of information included in representations of images generated by the first portion of the first trained machine learning model.

* * * * *